US011977382B2

(12) United States Patent
Ding et al.

(10) Patent No.: US 11,977,382 B2
(45) Date of Patent: May 7, 2024

(54) RANKING AGENTS NEAR AUTONOMOUS VEHICLES BY MUTUAL IMPORTANCE

(71) Applicant: Waymo LLC, Mountain View, CA (US)

(72) Inventors: Kai Ding, Santa Clara, CA (US); Minfa Wang, Los Altos, CA (US); Haoyu Chen, Sunnyvale, CA (US); Khaled Refaat, Mountain View, CA (US); Stephane Ross, San Jose, CA (US); Wei Chai, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/197,561

(22) Filed: May 15, 2023

(65) Prior Publication Data

US 2023/0288929 A1    Sep. 14, 2023

Related U.S. Application Data

(63) Continuation of application No. 16/987,980, filed on Aug. 7, 2020, now Pat. No. 11,687,077.

(51) Int. Cl.
*G05D 1/02* (2020.01)
*G05D 1/00* (2006.01)
*G06N 3/08* (2023.01)

(52) U.S. Cl.
CPC ......... *G05D 1/0088* (2013.01); *G05D 1/0214* (2013.01); *G06N 3/08* (2013.01); *G05D 2201/0213* (2013.01)

(58) Field of Classification Search
CPC ............ B60W 40/04; B60W 60/00276; G05D 1/0088; G05D 1/0214; G05D 2201/0213; G06F 16/24578; G06N 3/006; G06N 3/04; G06N 3/0454; G06N 3/08
See application file for complete search history.

(56) References Cited

U.S. PATENT DOCUMENTS

| | | |
|---|---|---|
| 8,706,298 B2 | 4/2014 | Goulding |
| 8,861,842 B2 | 10/2014 | Jung et al. |
| 9,092,985 B2 | 7/2015 | Richardson |
| 9,248,834 B1 | 2/2016 | Ferguson et al. |

(Continued)

OTHER PUBLICATIONS

Baumann et al., "Predicting Ego-Vehicle Paths from Environmental Observations with a Deep Neural Network," 2018 IEEE International Conference on Robotics and Automation (ICRA), May 2018, 4709-4716.

(Continued)

*Primary Examiner* — Hunter B Lonsberry
*Assistant Examiner* — Matthew J. Reda
(74) *Attorney, Agent, or Firm* — Fish & Richardson P.C.

(57) ABSTRACT

Methods, systems, and apparatus, including computer programs encoded on a computer storage medium, for identifying high-priority agents in the vicinity of a vehicle. The high-priority agents can be identified based on a set of mutual importance scores in which each mutual importance score indicates an estimated mutual relevance between the vehicle and a different agent from a set of agents on planning decisions of the other. The mutual importance scores can be calculated based on importance scores assessed from the perspectives of both the vehicle and the agents.

20 Claims, 8 Drawing Sheets

(56) References Cited

U.S. PATENT DOCUMENTS

| | | | |
|---|---|---|---|
| 10,059,334 B1* | 8/2018 | Zhu | B60W 30/09 |
| 10,739,777 B2 | 8/2020 | Refaat et al. | |
| 2006/0165811 A1 | 7/2006 | Black | |
| 2008/0161986 A1 | 7/2008 | Breed | |
| 2010/0104199 A1 | 4/2010 | Zhang | |
| 2012/0070034 A1 | 3/2012 | Xiao et al. | |
| 2013/0054106 A1* | 2/2013 | Schmudderich | G01S 13/931 701/1 |
| 2014/0140353 A1 | 5/2014 | Stahlin et al. | |
| 2014/0156806 A1 | 6/2014 | Karpistsenko | |
| 2015/0286219 A1 | 10/2015 | Reichel et al. | |
| 2016/0082953 A1 | 3/2016 | Teller | |
| 2018/0046920 A1 | 2/2018 | Yang | |
| 2018/0075309 A1* | 3/2018 | Sathyanarayana | G05D 1/0055 |
| 2018/0194349 A1 | 7/2018 | McGill | |
| 2018/0299275 A1 | 10/2018 | Fong et al. | |
| 2020/0156632 A1 | 5/2020 | Ding et al. | |
| 2020/0159215 A1 | 5/2020 | Ding et al. | |
| 2020/0159232 A1 | 5/2020 | Refaat et al. | |
| 2020/0333794 A1 | 10/2020 | Refaat et al. | |
| 2021/0232147 A1 | 7/2021 | Refaat et al. | |
| 2021/0269023 A1 | 9/2021 | Ding et al. | |
| 2022/0032960 A1* | 2/2022 | Wang | G05D 1/0088 |

OTHER PUBLICATIONS

Deo et al., "Multi-Modal Trajectory Prediction of Surrounding Vehicles with Maneuver based LSTMs," https://arxiv.org/abs/1805.05499, May 2018, 6 pages.

Girshick, "Fast R-CNN," arXiv 1504.08083v2, Sep. 27, 2015, 9 pages.

Kim et al., "Probabilistic Vehicle Trajectory Prediction over Occupancy Grid Map via Recurrent Neural Network," https://arxiv.org/abs/1704.07049v1, Apr. 2017, 6 pages.

Leitner et al., "Learning Spatial Object Localization from Vision on a Humanoid Robot," International Journal of Advanced Robotic Systems, vol. 9, Dec. 2012, 10 pages.

Mehrasa et al., "Learning Person Trajectory Representations for Team Activity Analysis," arXiv 1706.00893v1, Jun. 3, 2017, 9 pages.

Nutzel, "AI-based movement planning for autonomous and teleoperated vehicles including the development of a simulation environment and an intelligent agent," Master's thesis for degree of Master of Science, Technical University of Munich, Department of Mechanical Engineering, Jul. 15, 2018, 120 pages.

PCT International Preliminary Report on Patentability in International Appln. No. PCT/US2019/060187, mailed on Jun. 3, 2021, 9 pages.

PCT International Preliminary Report on Patentability in International Appln. No. PCT/US2019/060886, mailed on Jun. 3, 2021, 8 pages.

PCT International Search Report and Written Opinion in International Appln. PCT/US2019/058836, mailed on Feb. 27, 2020, 6 pages.

PCT International Search Report and Written Opinion in International Appln. No. PCT/US2019/060187, mailed on Mar. 19, 2020, 16 pages.

PCT International Search Report and Written Opinion in International Appln. No. PCT/US2019/060886, mailed on Mar. 13, 2020, 7 pages.

Refaat et al., "Agent Prioritization for Autonomous Navigation," https://arxiv.org/abs/1909.08792, Sep. 2019, 8 pages.

Schwarting et al., "Planning and Decision-Making for Autonomous Vehicles," Annual Review of Control, Robotics, and Autonomous Systems, Jan. 2018,1:187-210.

Zhao et al., "A novel three-dimensional object detection with the modified you only look once method," International Journal of Advanced Robotic Systems, Mar. 2018, 13 pages.

* cited by examiner

RANKING AGENTS NEAR AUTONOMOUS VEHICLES BY MUTUAL IMPORTANCE

CROSS-REFERENCE TO RELATED APPLICATIONS

This application is a continuation application of and claims priority to U.S. application Ser. No. 16/987,980, filed on Aug. 7, 2020, which is incorporated herein by reference in its entirety.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs on-board a vehicle that generates prediction data for agents in a vicinity of the vehicle based on estimated levels of interaction between the agents and the vehicle. In particular, the estimated level of interaction between a vehicle and an agent can reflect not only the likely impact that the agent will have on planning decisions of the vehicle, but also the likely impact that the vehicle will have on planning decisions of the agent.

In a first aspect, implementations of the subject matter disclosed herein includes a method performed by a system having one or more data processing apparatus. The method can include identifying a set of agents in a vicinity of a vehicle. The system determines a first set of importance scores and one or more second sets of importance scores. Each importance score in the first set indicates an estimated relevance of a different agent from the set of agents on planning decisions of the vehicle. Each second set is determined by assigning a different agent from the set of agents as a reference agent for the second set, and each importance score in each second set indicates an estimated relevance of a different non-reference agent or the vehicle on planning decisions of the reference agent. A set of mutual importance scores is then determined based on the first set of importance scores and the one or more second sets of importance scores, wherein each mutual importance score indicates an estimated mutual relevance between the vehicle and a different agent from the set of agents on planning decisions of the other. At least one score from the set of mutual importance scores can be used in a process for planning movements of the vehicle.

These and other implementations can further include one or more of the following features.

Determining the first set of importance scores can include processing first environment data that characterizes a portion of an environment in the vicinity of the vehicle, and the first environment data can be oriented around the vehicle.

The first environment data can identify locations of the set of agents in the environment in the vicinity of the vehicle.

Determining the first set of importance scores can further include processing first motion data that characterizes movement of the vehicle. The first motion data can describe at least one of past locations of the vehicle in the environment, a current location of the vehicle in the environment, predicted future locations of the vehicle in the environment, a past velocity of the vehicle, a current velocity of the vehicle, a predicted future velocity of the vehicle, a past acceleration of the vehicle, a current acceleration of the vehicle, a predicted future acceleration of the vehicle, a past heading of the vehicle, a current heading of the vehicle, or a predicted future heading of the vehicle.

Determining the first set of importance scores can further include processing second motion data that characterizes movements of one or more of the set of agents in the vicinity of the environment.

A first importance scoring model can be used to determine the first set of importance scores, and a second importance scoring model can be used to determine the one or more second sets of importance scores. The first importance scoring model can be more computationally demanding than the second importance scoring model. The first and second importance scoring models can include respective neural networks (e.g., feedforward, recurrent, or convolutional neural networks).

Determining the first set of importance scores can include designating the vehicle as a reference agent and the set of agents in the vicinity of the vehicle as respective non-reference agents.

Determining the one or more second sets of importance scores can include, for each second set: processing second environment data characterizing a portion of an environment in a vicinity of the respective reference agent for the second set. The second environment data can be oriented around the respective reference agent for the second set.

Determining the first set of importance scores can include processing first motion data that characterizes at least one of past or predicted future movements of the vehicle. The one or more second sets of importance scores can be determined without processing motion data that characterizes past or predicted future movements of the vehicle or the set of agents.

The set of mutual importance scores can indicate a higher mutual importance to a first agent that has (i) higher importance to planning decisions of the vehicle according to the first set of importance scores and (ii) for which the vehicle has higher importance to planning decisions of the first agent according to the second set of importance scores corresponding to the first agent. The set of mutual importance scores can indicate lower mutual importance to a second agent that has (i) lower importance to planning decisions of the vehicle according to the first set of importance scores and (ii) for which the vehicle has lower importance to planning decisions of the second agent according to the second set of importance scores corresponding to the second agent.

The set of mutual importance scores can be probability values that indicate an absolute level of mutual importance, or can be ranking values that indicate ranks of agents relative to each other with respect to mutual importance to the vehicle.

The vehicle can be a fully autonomous or semi-autonomous vehicle, and the set of agents can include other vehicles, pedestrians, or cyclists in the vicinity of the vehicle.

Determining the first set of importance scores can include processing a feature representation of each of the set of agents, where the feature representation of an agent includes one or more of: a velocity of the agent, an acceleration of the agent, a type of the agent, a distance from the agent to the vehicle, and data indicating whether a predicted trajectory of the agent will overlap a trajectory of the vehicle.

A proper subset of the set of agents with the highest mutual importance scores can be identified as high-priority agents. For only those agents of the set of agents that are identified as high-priority agents, data can be generated characterizing the agents using a first prediction model. Using at least one score from the set of mutual importance scores in the process for planning movements of the vehicle can include providing the data characterizing the high-priority agents generated using the first prediction model to a planning system of the vehicle to generate planning decisions for planning a future trajectory of the vehicle.

In additional aspects, implementations of the subject matter disclosed herein include systems comprising a data processing apparatus and memory in communication with the data processing apparatus which store instructions that, when executed, cause the data processing apparatus to perform actions corresponding to any of the methods disclosed in this specification. In yet additional aspects, implementations of the subject matter disclosed herein include one or more non-transitory computer-readable storage media having instructions stored thereon that, when executed by data processing apparatus, cause the data processing apparatus to perform actions corresponding to any of the methods disclose in this specification.

Particular embodiments of the subject matter described in this specification can be implemented so as to realize one or more of the following advantages.

In order for a planning system of a vehicle to generate planning decisions which cause the vehicle to travel along a safe and comfortable trajectory, the planning system should be provided with timely and accurate prediction data (e.g., behavior prediction data) for the agents (e.g., pedestrians, other motor vehicles, cyclists) in the vicinity of the vehicle. However, generating prediction data for an agent in the vicinity of the vehicle may require substantial computational resources (e.g., memory, computing power, or both). In certain situations, a large number of other agents in the environment may be in the vicinity of the vehicle (e.g., when the vehicle is traveling along a busy highway). In these situations, the limited computational resources available on-board the vehicle may be insufficient to generate timely prediction data for all the agents in the vicinity of the vehicle.

The on-board system described in this specification can concentrate the limited computational resources available on-board the vehicle (e.g., memory, computing power, or both) on generating precise prediction data for only those agents which are deemed most important, such as those that are deemed to be most interactive with the vehicle or those that have the biggest impact on the planning decisions generated by the planning system of the vehicle. Alternatively, predictions of different resolutions, type, or degree may be made for different agents according to the level of importance of each agent. In this manner, the on-board system described in this specification can generate timely prediction data which enables the planning system to generate planning decisions that cause the vehicle to travel along a safe and comfortable trajectory despite the limited computational resources available on-board the vehicle. Moreover, this specification describes techniques for improving identification of high-priority agents by assessing the mutual importance of agents in an environment in the vicinity of the vehicle. By assessing the mutual importance of agents, the vehicle can more accurately determine which agents exhibit an interactive relationship with the vehicle. For example, the mutual importance of an agent can be based not only on the estimated relevance of the agent to planning decisions of the vehicle (from the vehicle's perspective), but also based on the estimated relevance of the vehicle to the agent's planning decisions (from the agent's perspective).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an on-board system of a vehicle can generate prediction data (e.g., behavior prediction data) for agents in the vicinity of the vehicle. The agents in the vicinity of the vehicle may be, for example, pedestrians, bicyclists, or other vehicles. To generate the prediction data, the on-board system determines a respective mutual importance score for all, or at least a subset of, the detected agents in the vicinity of the vehicle. The mutual importance score for an agent characterizes an estimated level of interaction between the vehicle and the agent under both the vehicle's and the agent's perspectives. For example, the mutual importance for an agent can be assessed by first estimating the relevance (e.g., impact) of the agent on planning decisions of the vehicle (e.g., decisions related to planning a future trajectory of the vehicle). The system can then estimate, from the agent's point-of-view, the relevance of the vehicle on the agent's own planning decisions. Using estimates from both the vehicle's and agents' perspectives, mutual importance scores can be determined that reflect an estimated mutual relevance or interaction between the vehicle and each agent. The on-board system identifies which of the agents in the vicinity of the vehicle are "high-priority" agents based at least on the mutual importance scores, and generates precise prediction data for these high-priority agents using a prediction model. For the remaining agents in the vicinity of the vehicle which are not high-priority agents, the on-board system can use less computationally-intensive (but potentially less precise) prediction models to generate prediction data. Alternatively, the on-board system may refrain from generating prediction data for some or all of the agents that are not determined to be high-priority agents. These features and other features are described in more detail below.

Figure 1:
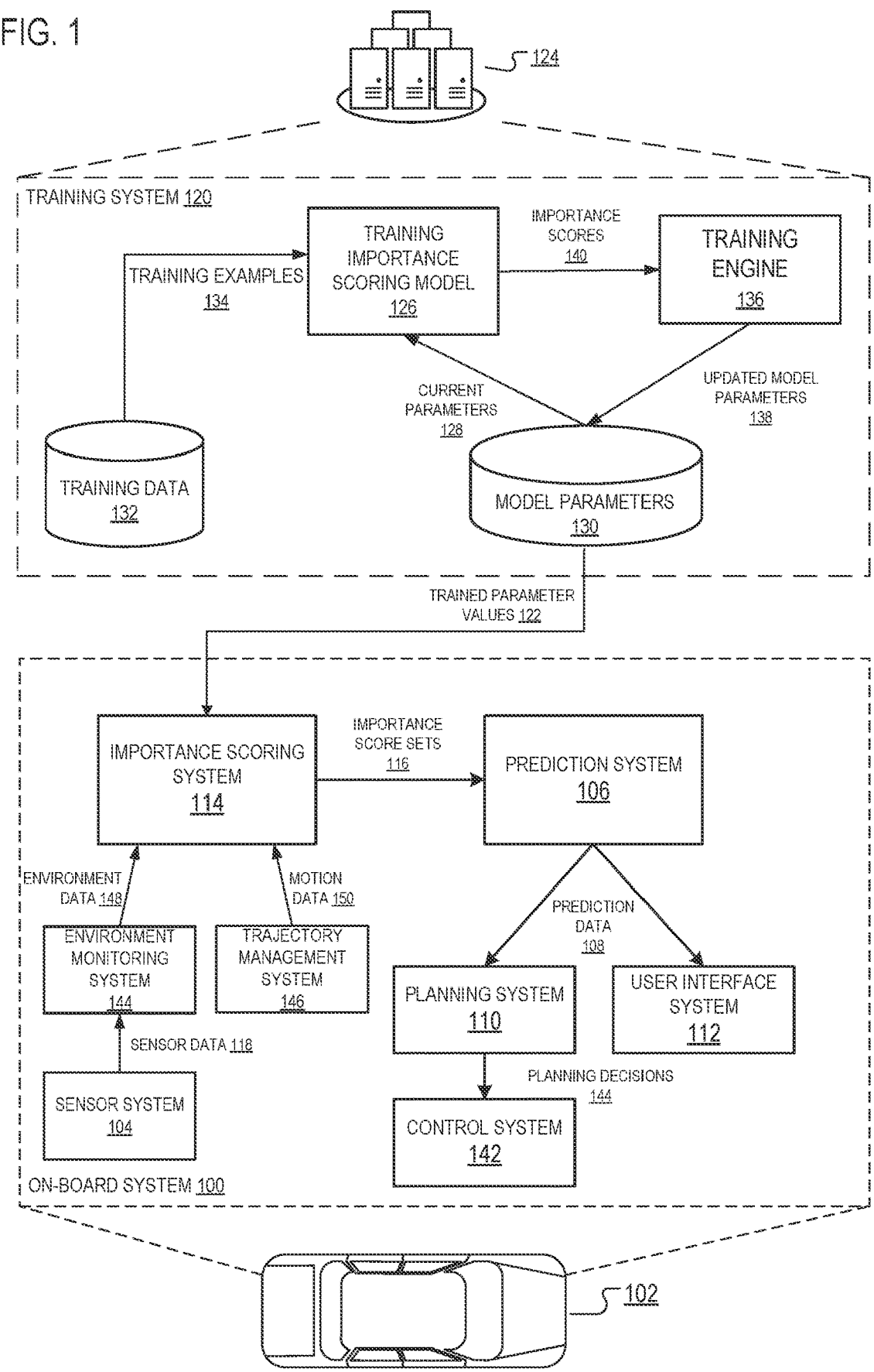
FIG. 1 is a block diagram of an example on-board system and an example training system for training an importance scoring model.

FIG. 1 is a block diagram of an example on-board system 100. The on-board system 100 is composed of hardware and software components, some or all of which are physically located on-board a vehicle 102. In some cases, the on-board system 100 can generate planning decisions which plan the future trajectory of the vehicle 102, present information to the driver of the vehicle 102 to assist the driver in operating the vehicle safely, or both. For example, in response to determining that the trajectory of another vehicle is likely to cross the trajectory of the vehicle 102, the on-board system 100 may generate planning decisions which adjust the future trajectory of the vehicle 102 to avoid a collision (e.g., by braking). As another example, in response to determining that the trajectory of another vehicle is likely to cross the trajectory of the vehicle 102, the on-board system 100 may present an alert message which prompts the driver of the vehicle 102 to adjust the trajectory of the vehicle 102 to avoid a collision.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be a watercraft or an aircraft. Moreover, the on-board system 100 can include components additional to those depicted in FIG. 1 (e.g., a collision detection system or a navigation system).

The on-board system 100 includes a sensor system 104 which enables the on-board system 100 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

The sensor system 104 continually (i.e., at each of multiple time points) captures raw sensor data which can indicate the directions, intensities, and distances travelled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

At any given time point, one or more agents in the environment may be in the vicinity of the vehicle 102. The agents in the vicinity of the vehicle 102 may be, for example, pedestrians, bicyclists, or other vehicles. The on-board system 100 uses a prediction system 106 to continually (e.g., at each of multiple time points) generate prediction data 108 which characterizes some or all of the agents in the vicinity of the vehicle 102. For example, for each of multiple agents in the vicinity of the vehicle 102, the prediction data 108 may be behavior prediction data which defines respective probabilities that the agent makes each of a predetermined number of possible driving decisions (e.g., yielding, changing lanes, passing, braking, or accelerating). As another example, for each of the multiple agents in the vicinity of the vehicle 102, the prediction data 108 may be classification prediction data which defines respective probabilities that the agent is each of a predetermined number of possible agent types (e.g., animal, pedestrian, bicyclist, car, or truck).

The on-board system 100 can provide the prediction data 108 generated by the prediction system 106 to a planning system 110, a user interface system 112, or both.

When the planning system 110 receives the prediction data 108, the planning system 110 can use the prediction data 108 to generate planning decisions 144 which plan the future trajectory of the vehicle 102. The planning decisions 144 generated by the planning system 110 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. In a particular example, the on-board system 100 may provide the planning system 110 with behavior prediction data indicating that the future trajectory of another vehicle is likely to cross the future trajectory of the vehicle 102, potentially resulting in a collision. In this example, the planning system 110 can generate a planning decision 144 to apply the brakes of the vehicle 102 to avoid a collision.

The planning decisions 144 generated by the planning system 110 can be provided to a control system 142 of the vehicle 102. The control system 142 of the vehicle can control some or all of the operations of the vehicle by implementing the planning decisions 144 generated by the planning system. For example, in response to receiving a planning decision 144 to apply the brakes of the vehicle, the control system 142 of the vehicle 102 may transmit an electronic signal to a braking control unit of the vehicle. In response to receiving the electronic signal, the braking control unit can mechanically apply the brakes of the vehicle.

When the user interface system 112 receives the prediction data 108, the user interface system 112 can use the prediction data 108 to present information to the driver of the vehicle 102 to assist the driver in operating the vehicle 102 safely. The user interface system 112 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the on-board system 100 may provide the user interface system 112 with prediction data 108 indicating that the future trajectory of another vehicle is likely to cross the future trajectory of the vehicle 102, potentially resulting in a collision. In this example, the user interface system 112 can present an alert message to the driver of the vehicle 102 with instructions to adjust the trajectory of the vehicle 102 to avoid a collision.

In order for the planning system 110 to generate planning decisions which cause the vehicle 102 to travel along a safe and comfortable trajectory, the on-board system 100 must provide the planning system 110 with timely and accurate prediction data 108. However, the prediction system 106 may require substantial computational resources (e.g., memory, computing power, or both) to generate prediction data 108 for an agent in the vicinity of the vehicle. In certain situations, a large number of other agents in the environment may be in the vicinity of the vehicle 102 (e.g., when the vehicle 102 is traveling along a busy highway). In these situations, the limited computational resources available on-board the vehicle 102 may be insufficient for the prediction system 106 to generate timely prediction data 108 for all the agents in the vicinity of the vehicle 102.

To enable the prediction system 106 to generate timely prediction data 108, the on-board system 100 can identify one or more of the agents in the vicinity of the vehicle 102 as "high-priority" agents. In some cases, the on-board system 100 identifies only a fraction of the agents in the vicinity of the vehicle 102 as high-priority agents. The prediction system 106 is then configured to generate precise prediction data 108 for the high-priority agents using a prediction model (e.g., a prediction neural network). The prediction system 106 can generate prediction data 108 for any remaining agents which are not identified as high-priority agents, and which will be referred to in this specification as "low-priority" agents, using less computationally intensive (but potentially less precise) behavior prediction models. Alternatively, the on-board system 100 may refrain from generating any prediction data 108 for some or all of the low-priority agents. In this specification, a "prediction model" should be understood as implementing a prediction algorithm.

The on-board system 100 determines which of the agents in the vicinity of the vehicle 102 to designate as high-priority agents using an importance scoring system 114 and a ranking engine within prediction system 106. As will be described further with respect to FIGS. 2-5, the importance scoring system generates sets of importance scores 116 that indicate estimated relevance of agents in the environment on the vehicle, or other estimated relevance non-reference agents in the environment on a designated reference agent. The importance scoring system can generate the importance scores 116 with one or more scoring models, which can be implemented, for example, as a neural network model, a random forest model, a support vector machine (SVM) model, or as any other type of trainable machine learning model.

In some examples, primary and secondary importance scoring models are provided within system 114, and each model is configured to process an input data representation of environment data 148 and, optionally, motion (e.g., trajectory) data 150. Environment data 148 can include a current observation of the environment based on sensor data 118, pre-defined data such as a road graph, and indications of current locations of the vehicle and secondary agents in the environment. Motion data 150 can describe motion parameters from the past, planned or predicted motion parameters for the future, or both, for the vehicle, secondary agents, or both. The importance scores 116 are processed to determine mutual importance scores between the vehicle and each secondary agent. Based on the mutual importance scores, on-board system 100 can determine one or more of the secondary agents in the vicinity of the vehicle with the highest importance scores to be high-priority agents.

In a particular example, at a particular intersection there may be: (i) an oncoming vehicle which may turn into the path of the vehicle 102, and (ii) a bicyclist which is far behind the vehicle 102 and unlikely to affect the planning decisions of the planning system 110. In this example, the importance scoring system 114 may generate a higher importance score for the oncoming vehicle than for the bicyclist, potentially causing the oncoming vehicle to be designated a high-priority agent and the bicyclist a low-priority agent.

By generating prediction data 108 based on mutual importance scores, the on-board system 100 can concentrate its limited computational resources on generating precise prediction data 108 for only those agents which are likely to have the biggest impact on the planning decisions generated by the planning system 110. In this manner, the on-board system 100 can generate timely prediction data 108 which enables the planning system 110 to generate planning decisions that cause the vehicle to travel along a safe and comfortable trajectory despite the limited computational resources available on-board the vehicle 102.

In some cases, the on-board system 100 can provide the mutual importance scores directly to the planning system 110. The planning system 110 can use the mutual importance scores by, for example, allocating a greater amount of computational resources to processing data characterizing the high-priority agents than the low-priority agents in generating the planning decisions 144. More generally, any processing module of the on-board system (including but not limited to the prediction system 106 and the planning system 110) can use the mutual importance scores to allocate a greater amount of computational resources to processing data characterizing the high-priority agents than the low-priority agents.

To allow the importance scoring system 114 to accurately prioritize agents, a training system 120 can determine trained parameter values 122 of the importance scoring model included in the importance scoring system 114. The training system 120 is typically hosted within a data center 124, which can be a distributed computing system having hundreds or thousands of computers in one or more locations.

The training system 120 includes a training importance scoring model 126 that is configured to process agent feature representations to generate corresponding importance scores 140 for the agents. The training system 120 includes multiple computing devices having software or hardware modules that implement the operations of the training importance scoring model 126. For example, if the training importance scoring model 126 is an importance scoring neural network, then the training system 120 includes multiple computing devices having software or hardware modules that implement the respective operations of each layer of the training importance scoring neural network according to an architecture of the training importance scoring neural network. The training importance scoring model 126 is generally the same model (or almost the same model) as the on-board importance scoring model. For example, if the training importance scoring model is a neural network, then it generally has (at least partially) the same architecture as the on-board importance scoring neural network included in the importance scoring system 114.

The training importance scoring model 126 can compute the operations of the training importance scoring model 126 using current values of parameters 128 stored in a collection of model parameters 130. Although illustrated as being logically separated, the model parameters 130 and the software or hardware modules performing the operations may actually be located on the same computing device or on the same memory device.

The training system 120 trains the training importance scoring model 126 using a training data set 132 which includes multiple training examples 134. The training examples 134 may be obtained from real or simulated driving logs. Each of the training examples 134 includes respective feature representations of each agent in a vicinity of a vehicle at a respective time point as well as a label defining a ranking of the agents in order of their impact on planning decisions generated by a planning system of the vehicle. An example process for generating training examples 134 is described with reference to FIG. 6.

The training importance scoring model 126 can process the respective agent feature representations from the training examples 134 to generate, for each training example 134, respective importance scores 140. A training engine 136 analyzes the importance scores 140 and compares the ranking of the agents defined by the importance scores 140 to the ranking of the agents defined by the labels in the training examples 134. For example, when the training importance scoring model 126 is a neural network, the training engine 136 can compute gradients of a loss function that characterizes the difference between the ranking of the agents defined by the generated importance scores 140 and the ranking of the agents defined by the labels in the training examples 134. In a particular example, the loss function may be a binary (e.g., cross-entropy) loss function which characterizes whether the ranking of two of the agents defined by the generated importance scores 140 is the same as the ranking of the two agents defined by the labels in the training examples 134.

The training engine 136 then generates updated model parameter values 138 by using an appropriate machine learning training technique (e.g., stochastic gradient descent). The training engine 136 can then update the collection of model parameters 130 using the updated model parameter values 138.

After training is complete, the training system 120 can provide a set of trained parameter values 122 to the on-board system 100 for use in generating importance scores that enable the generation of timely and accurate behavior prediction data 108. The training system 120 can provide the set of trained parameter values 122 by a wired or wireless connection to the on-board system 100.

Figure 2:
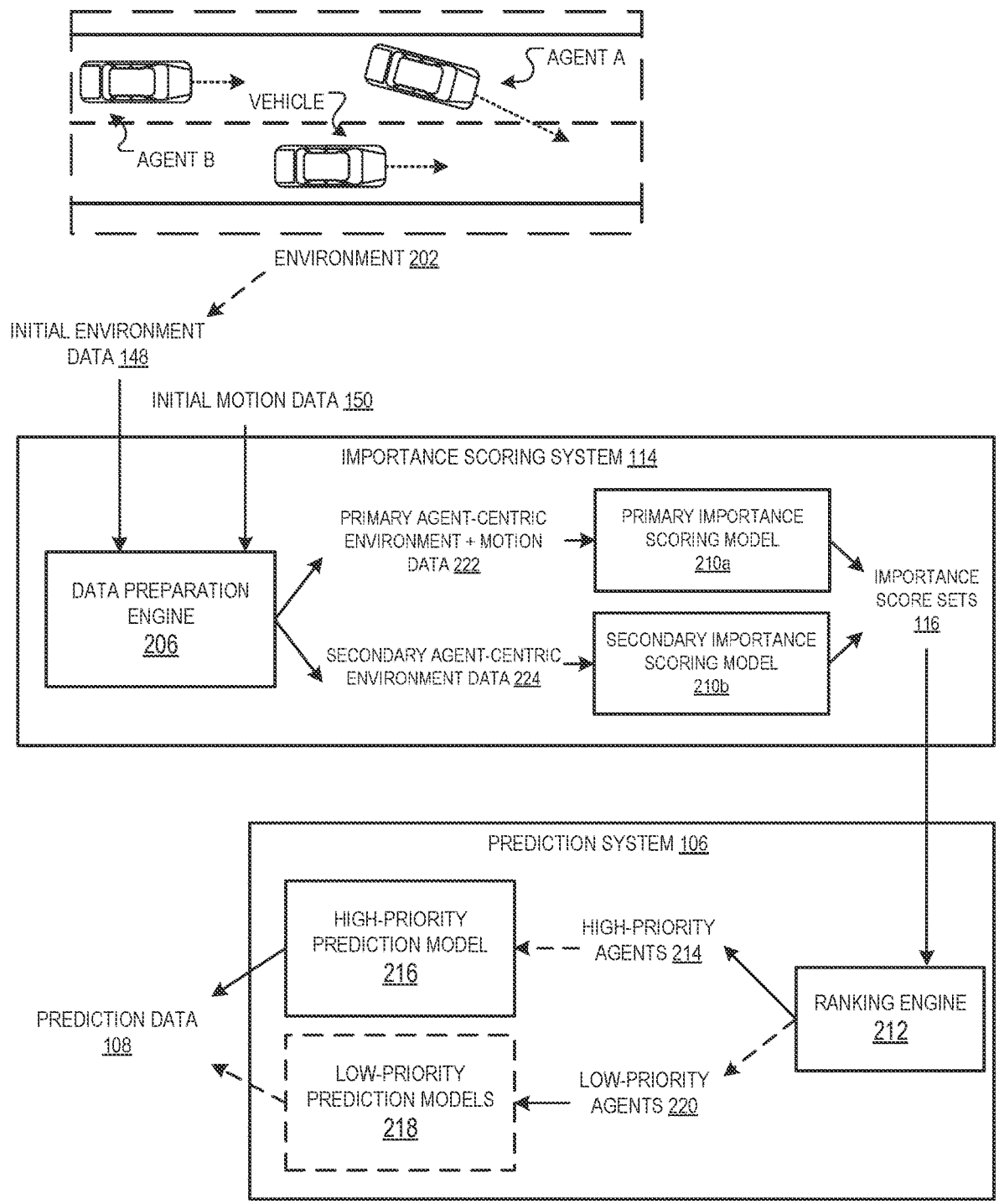
FIG. 2 is a block diagram of an example importance scoring system and an example prediction system.

FIG. 2 is a block diagram of an example importance scoring system 114 and an example prediction system 106. The importance scoring system 114 and the prediction system 106 are examples of systems implemented as computer programs on one or more computers in one or more locations in which the systems, components, and techniques described below are implemented.

The importance scoring system 114 is configured to process initial environment data 148, which characterizes the environment 202 in the vicinity of the vehicle 102, and initial motion data 150, which characterizes movements of the vehicle 102 (and, optionally, secondary agents in the environment) to generate sets of importance scores 116. A respective set of importance scores 116 can be generated for each agent (including the vehicle 102 as primary agent and nearby secondary agents) in the environment in the vicinity of the vehicle 102. The set of importance scores 116 for each agent (i.e., reference agent) includes scores that each indicate an estimated impact on planning decisions of the planning system as a result of the presence of another agent in the environment (i.e., a non-reference agent) on the reference agent for the set 116.

In a particular example depicted in FIG. 2, the environment 202 is a roadway and two vehicles, denoted Agent A and Agent B, are in the vicinity of the vehicle 102. Agent A is maneuvering to cut in front of the vehicle 102, while Agent B is travelling parallel to the vehicle 102. In this example, the importance scoring system 114 may assign a higher importance score to Agent A than to Agent B, specifically, because Agent A is likely to have a greater impact on the planning decisions generated by the planning system 110 of the vehicle 102. For example, the planning system 110 of the vehicle 102 may generate planning decisions which cause the vehicle 102 to brake to avoid a collision with Agent A.

To generate the sets of importance scores 116, the importance scoring system 114 processes the initial environment and motion data 148, 150 using a data preparation engine 206. In some implementations, the data preparation engine 206 is configured to identify each of the secondary agents in the vicinity of the vehicle 102 and generate a respective agent-centric data input 222 or 224 for each agent. Additional detail on techniques for generating the agent-centric data representations 222 and 224 are describes with respect to FIGS. 3A-3B and 4.

In some implementations, the agent-centric data representations 222, 224 can include feature representations of each non-reference agent in the vicinity of a reference agent in the environment. The feature representation for an agent can be numerical data represented in any appropriate numerical format (e.g., as a vector or a matrix) which characterizes the agent. The feature representation of an agent can include one or more of: a velocity of the agent (e.g., measured in miles per hour—mph), an acceleration of the agent (e.g., measured in feet per second squared), a type of the agent (e.g., pedestrian, vehicle, bicyclist, and the like), a distance from the agent to the reference agent (e.g. measured in feet), data indicating whether (and when) a predicted future trajectory of the agent will overlap with a future trajectory of the reference agent, a position of the agent relative to the reference agent, and data characterizing the velocity, acceleration, and heading of the agent over a previous window of time (e.g., 1, 2, 5, or 10 seconds).

A primary importance scoring model 210 processes a primary agent-centric data representation 222 to generate a first set of importance scores that describe the estimated impact of each secondary agent on planning decisions of the vehicle 102. A secondary importance scoring model 210b processes each secondary agent-centric data representation 224 to generate second sets of importance scores that describe the estimated impact of other (non-reference) agents on planning decisions for the corresponding secondary agent for the set. The importance scoring models 210a, 210b can be implemented as any appropriate machine-learning model, for example, as a neural network (with any appropriate architecture), a random forest, or a support vector machine. Additional detail on the importance scoring models 210a, 210b are described with respect to FIGS. 3A-3B.

The sets of importance scores 116 generated by the importance scoring system 114 can be used by the prediction system 106 to generate prediction data 108 which characterizes one or more agents in the vicinity of the vehicle. In particular, the sets of importance scores 116 may be processed by a ranking engine 212 to determine estimated levels of interaction between the vehicle 102 and each secondary agent in the vicinity of the vehicle 102. The estimated levels of interaction can be computed based by evaluating the estimated relevance of each agent on the planning decisions of vehicle 102, and vice versa, and the estimated levels can be expressed as mutual importance scores. The prediction data 108 derived in part using the mutual importance scores may be behavior prediction data which characterizes the predicted future behavior of one or more of the agents in the vicinity of the vehicle 102. In this example, for one or more of the agents in the vicinity of the vehicle 102, the prediction data 108 may define respective probabilities that the agent makes each of a predetermined number of possible driving decisions (e.g., yielding, changing lanes, passing, braking, or accelerating). As another example, the prediction data 108 may be classification prediction data which defines respective probabilities that the agent is each of a predetermined number of possible agent types (e.g., animal, pedestrian, bicyclist, car, or truck).

The prediction system 106 further uses ranking engine 212 to identify which (if any) of the secondary agents in the vicinity of the vehicle 102 are high-priority agents. For example, the ranking engine 212 may classify each secondary agent with a mutual importance score that satisfies a predetermined threshold as a high-priority agent. In a particular example, the ranking engine may identify each agent with a mutual importance score that exceeds the predetermined threshold of 0.8 as a high-priority agent. As another example, the ranking engine 212 may identify a predetermined number of the secondary agents with the highest importance scores as high-priority agents. In a particular example, the ranking engine 212 may identify the three agents with the highest mutual importance scores as high priority agents. As another example, the ranking engine may identify a dynamically determined number of agents with the highest mutual importance scores as high-priority agents based on the computational resources currently available on-board the vehicle for behavior prediction.

After identifying the high-priority agents 214, the prediction system 106 uses a high-priority prediction model 216 to generate respective prediction data 108 for each of the high-priority agents 214. The high-priority prediction model 216 may generate prediction data 108 for an agent by, for example, processing a representation of the trajectory of the agent up to the current time point using a prediction neural network.

The prediction system 106 can use low-priority prediction models 218 to generate respective prediction data 108 for each of the remainder of the agents which the ranking engine 212 does not identify as high-priority agents 214 (i.e., the low-priority agents 220). In some cases, the prediction system 106 processes each of the low-priority agents 220 with the same low-priority prediction model. In some cases, the prediction system 106 includes multiple low-priority prediction models with different numbers of model parameters, and processes low-priority agents that have higher importance scores with low-priority behavior prediction models with more model parameters. Generally, the high-priority prediction model 216 has a greater number of model parameters than the low-priority prediction model 218, and can therefore generate more precise prediction data 108 than the low-priority prediction model 218. However, the low-priority prediction model 218 may consume fewer computational resources (e.g., memory, computing power, or both) than the high-priority prediction model 216. In a particular example, the high-priority prediction model 216 may be implemented as a deep neural network with thousands of model parameters, while the low-priority prediction model 218 may be implemented as a linear model with tens or hundreds of model parameters.

In some cases, the prediction system 106 may refrain from generating prediction data 108 for some or all of the low-priority agents 220. For example, the prediction system 106 may postpone generating behavior prediction data for the low-priority agents 220 until a later time point when more computational resources are available. In these examples, the prediction system 106 may require that prediction data be generated for each of the agents in the vicinity of the vehicle (regardless of their priority) with at least a minimum frequency (e.g., once per second).

The prediction data 108 generated for the high-priority agents 214 by the high-priority prediction model 216, and any prediction data 108 generated for the low-priority agents by the low-priority prediction model 218, is provided to the planning system 110 for use in generating planning decisions.

Figure 3A:
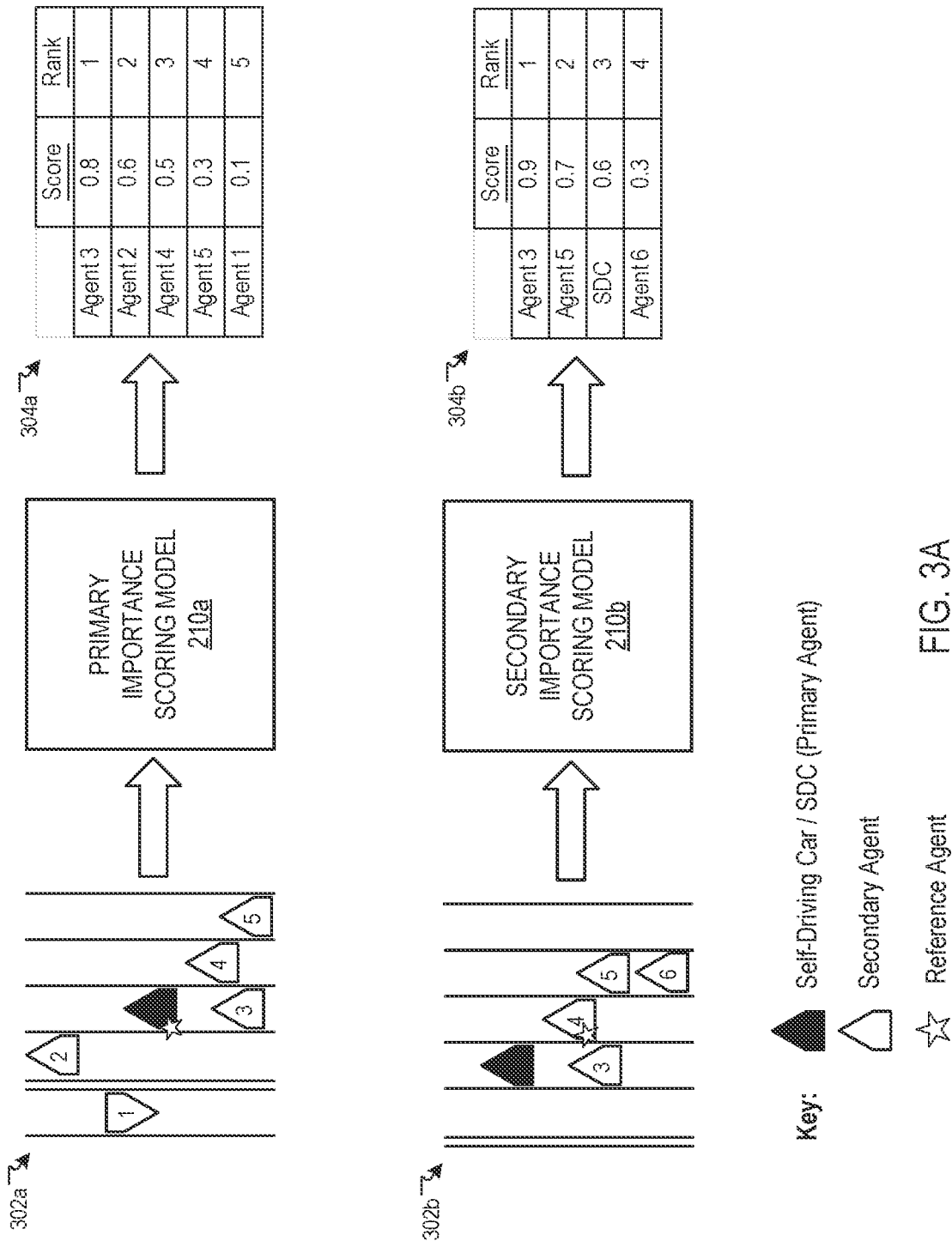
FIG. 3A depicts example scoring of reference agents by primary and secondary scoring models.

Referring to FIG. 3A, a pair of example scoring processes are shown for generating importance scores for agents in the vicinity of a vehicle (e.g., a self-driving car or other autonomous vehicle). In the first example, the primary agent is a self-driving car (shaded in black), and five other vehicles are identified as secondary agents (shaded in white) in a vicinity of the self-driving car. A first data input set 302a describes information about the environment surrounding the self-driving car, and can further include information describing past motion (e.g., movements) of the self-driving car, past motion of the secondary agents, predicted or planned motion of the self-driving car, and/or predicted motion of the secondary agents. In some implementations, the first data input set 302 includes a concatenation of multiple channels of data like those depicted in FIG. 4. Moreover, the first data input set 302a is primary-agent centric, and is thus oriented around the primary agent (i.e., the self-driving car). Specifically, the agent in which the data input set is oriented around is referred to herein as the "reference" agent, and FIG. 3A signifies the self-driving car as the reference agent by the star symbol overlaid on the representation of the vehicle.

In some implementations, orienting a data input set around a reference agent involves focusing the data input set such that the reference agent is located at or near a center of a two-dimensional patch representing a region of the environment. For example, the data input set 302a may include one or more layers that correspond to different channels of data (e.g., road graph data, position data, velocity data, heading data, acceleration data). Each layer can be aligned with the others and comprises a two-dimensional grid, where each position or cell in the grid represents a corresponding location in the real-world environment. The reference agent can be substantially centered in the 2D grid, while non-reference agents may occupy grid positions surrounding the reference agent. The data input sets can also be oriented to match the heading of the reference agent, e.g., such that the reference agent is always pointed toward the top of the grid. In some implementations, where the data input set describes features of the secondary agents rather than or in addition to grid representations, the feature values can be computed with respect to the reference agent. For example, the distance or heading of a non-reference agent can be computed relative to the current location and heading of the reference agent.

The first data input set 302a is processed by the primary importance scoring model 222a. In some implementations, primary importance scoring model 222a is reserved for processing inputs in which the primary agent (e.g., the self-driving car) is the reference agent. The primary importance scoring model 222a may be more computationally demanding than secondary importance scoring model 222b due to its ability to process larger, more informative input data sets and requiring more operations to be performed to generate an output. For example, primary importance scoring model 222a may be configured to process not just environment data representing a current state of the environment surrounding the reference agent, but also configured to process historical and/or predicted motion data for the reference agent and/or the non-reference agents. In contrast, secondary importance scoring model 222b may be configured to process more primitive inputs (e.g., a vector of feature values for each non-reference agent rather than multi-layered two-dimensional inputs), inputs that describe a current state of the environment but no past or future motion data for the reference agent and/or non-reference agents, or inputs that describe a current state of the environment and past motion data for the reference agent and/or non-reference agent but no future motion data. The provision of separate scoring models 222a and 222b can be advantageous by allowing for more refined generation of importance scores when the primary agent is the reference agent, while not dramatically increasing the computational expense associated with determining importance scores when a secondary agent is the reference agent. Additionally, the self-driving car may not readily have the same range of data inputs available for scoring from the perspective of secondary reference agents as it does for scoring from the perspective of the primary reference agent. Nonetheless, if there is relative parity in the data inputs available for primary reference agents and secondary reference agents, the same importance scoring model may be employed to process inputs in both situations.

Primary importance scoring model 222a processes the first data input set 302a to generate a first set of importance scores 304a. The first set of importance scores 304a indicate an estimated relevance or impact of each secondary agent on planning decisions of the self-driving car, and are typically determined independent of the reciprocal impact that the self-driving car has on planning decisions of the secondary agents. The scores can be in the form of a value that indicated an absolute estimate (e.g., a likelihood or probability value), or in the form of a ranking value that indicates the relative importance of the agent relative to other agents in the vicinity of the self-driving car. For instance, secondary agent 3 follow immediately behind the self-driving car in the same lane, and thus impacts planning decisions with respect to future movements of the self-driving car to a much greater extent than secondary agent 1, which is traveling in the opposite direction in a lane on the opposite side of the road. Accordingly, agent 3 is estimated to have greater importance than agent 1.

The second data input set 302b describes information about the environment surrounding the secondary agent 4. The second data input set 302b may or may not include information about past or predicted movements of the secondary agent 4 (i.e., the reference agent), past or predicted movements of the non-reference agents (e.g., the self-driving car and agents 3, 5-6), or both. The second data input set 302b is secondary-agent centric, and is thus oriented around a secondary agent (i.e., agent 4) as the reference agent. Secondary importance scoring model 222b processes the second data input set 302b to generate a second set of importance scores 304b. The second set of importance scores 304b indicates an estimated relevance or impact of each non-reference agent in the vicinity of agent 4 on planning decisions of the reference agent (i.e., agent 4), and are typically determined independent of the reciprocal impact that the reference agent has on planning decisions of the non-reference agents. For instance, agent 4 in this scenario is shown to be flanked by agents 3 and 5, and as a result, agents 3 and 5 are estimated to have a greater impact on planning decisions of agent 4 than the self-driving car or agent 6.

Figure 3B:
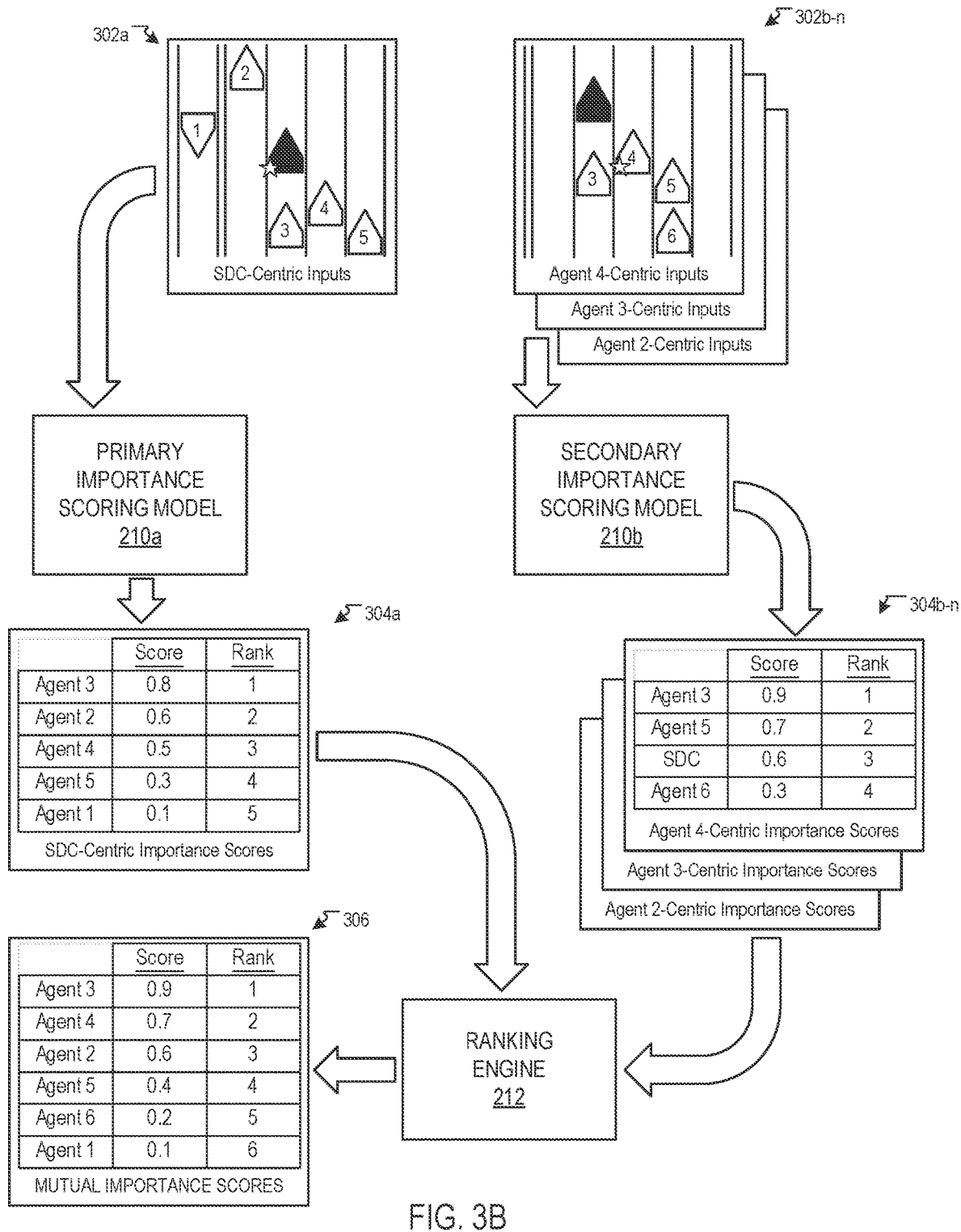
FIG. 3B depicts a process flow for generating mutual importance scores for agents in a vicinity of a vehicle.

Continuing the example from FIG. 3A, a process for generating mutual importance scores based on sets of agent-centric (non-mutual) importance scores is depicted in FIG. 3B. Importance scoring system 114 generates the first set of importance scores 304a by processing self-driving car-centric input 302a with primary importance scoring model 222a. The system 114 generates additional sets of importance scores 304b-n by processing secondary agent-centric data inputs 304b-n with secondary importance scoring model 222b. The system 114 then provides each set of importance scores 304a-n to ranking engine 212. Ranking engine 212 is programmed to process the respective sets of importance scores 304a-n to generate a set of mutual importance scores 306. The mutual importance scores indicate estimated levels of mutual relevance between the primary agent (i.e., the self-driving car) and all or some of the secondary agents detected in the vicinity of the primary agent. Mutual relevance is a two-way measure of interaction between a pair of agents. Unlike the agent-centric sets of importance scores 304a-n that reflect an estimated impact of non-reference agents on a reference agent's planning decisions (independent of the reciprocal consideration of the reference agent's impact on the non-reference agent's planning decisions), mutual relevance accounts for the impact on planning decisions in both directions.

Ranking engine 212 can employ any suitable function for generating mutual importance scores 306. In general, the mutual relevance between the self-driving car and a particular secondary agent will be highest when the self-driving car centric importance score for the particular secondary agent is high and the importance score of the self-driving car from the view of the particular secondary agent is also high. The mutual relevance decreases when the importance score from the view of the self-driving car, the importance score from the view of the particular secondary agent, or both, is lower. In some implementations, ranking engine 212 generates a respective mutual importance score between the self-driving car and each secondary agent by taking a sum of the importance score between (i) the self-driving car and the secondary agent from the self-driving car's perspective and (ii) the importance score between the self-driving care and the secondary agent from the secondary agent's perspective. The summed scores can be based on either the absolute importance scores or the ranking values. In some implementations, when taking the sum of importance scores between the self-driving car and a particular secondary agent to determine a mutual importance score, the score from the self-driving car's perspective can be weighted higher than the score from the secondary agent's perspective. In some implementations, ranking engine 212 generates mutual importance scores 306 by starting with SDC-centric importance scores 304a and updating the ranking of secondary agents in the first set of scores 304a by promoting the ranking of any secondary agents whose agent-centric importance score/ranking with respect to the self-driving car is sufficiently higher (e.g., at least a threshold ranking value).

Figure 4:
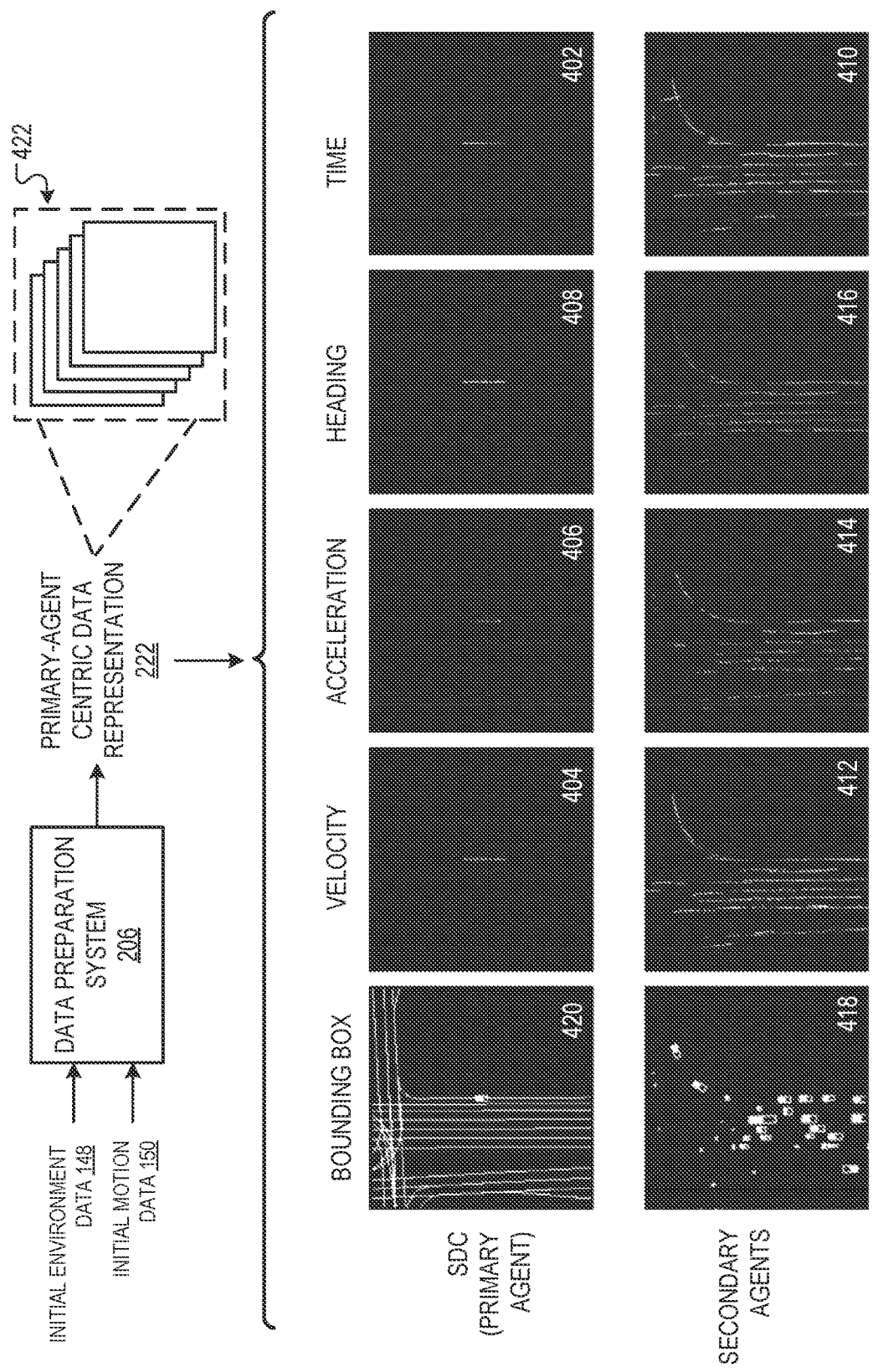
FIG. 4 depicts example data channels in a primary-agent centric data representation that can be processed by an importance scoring model.

FIG. 4 is a block diagram of an example data preparation system 206. The data preparation system 206 is an example of a system implemented as computer programs on one or more computers in one or more locations in which the systems, components, and techniques described below are implemented.

The data preparation system 206 processes the initial environment data 148 and initial motion data 150 to generate a primary-agent centric data representation 222. Although a data representation oriented about a primary agent (e.g., self-driving car) is shown here, the data preparation system 206 can similarly prepare agent-centric data representations for secondary agents in the vicinity of the primary agent. Data preparation system 206 receives an indication of which agent represented in initial environment data 148 and initial motion data 150 should be the reference agent, and then prepares a data representation oriented around the identified reference agent. In some cases, fewer data channels may be processed when generating an agent-centric data representation for a secondary agent than when system 206 generates the primary-agent centric data representation 222.

Data representation 222 is composed of multiple "channels". Each channel is a two-dimensional (2D) array of data values that represents a "top-down" perspective of the environment in the vicinity of the vehicle (i.e., the reference agent, which is the primary agent (self-driving car) in this example). Each position in each channel corresponds to a respective spatial position in the environment and can be indexed by respective coordinates. Each of the channels have the same dimensionality (i.e., the same number of rows and columns), the same top-down perspective of the environment, and are aligned (i.e., registered) with one another. That is, positions which are indexed by the same coordinates in different channels correspond to the same spatial position in the environment. In other words, corresponding positions in different channels correspond to the same spatial position in the environment.

To represent a trajectory of the vehicle, the data representation 222 includes a vehicle time channel and respective vehicle motion parameter channels corresponding to each of a predetermined number of motion parameters. Each of the motion parameters characterizes a respective characteristic of the motion of the vehicle, for example, the velocity, acceleration, or heading of the vehicle. As depicted in FIG. 4, the data representation 222 may include a vehicle time channel 402, a vehicle velocity channel 404, a vehicle acceleration channel 406, and a vehicle heading channel 408.

The vehicle time channel and the vehicle motion parameter channels represent the previous trajectory of the vehicle up to the current time point, and optionally, a candidate future trajectory of the vehicle after the current time point. A candidate future trajectory of the vehicle refers to a possible trajectory of the vehicle after the current time point. More specifically, a candidate future trajectory of the vehicle specifies, for each of multiple future time points after the current time point, a spatial position in the environment that can be occupied by the agent at the future time point. For each of the multiple future time points, the candidate future trajectory further specifies possible values of each of the predetermined number of motion parameters that characterize the motion of the vehicle at the future time point.

For brevity, the description which follows refers to the vehicle time channel and the vehicle motion parameter channels representing the previous trajectory of the vehicle up to the current time point. It should be understood that the vehicle time channel and the vehicle motion parameter channels can similarly represent a candidate future trajectory of the vehicle after the current time point in addition to the previous trajectory of the vehicle up to the current time point.

The vehicle time channel represents the respective time points at which the vehicle occupies different spatial positions in the environment in the previous trajectory of the vehicle. Each motion parameter channel represents the values of the respective motion parameter characterizing the motion of the vehicle when the vehicle occupies different spatial positions in the environment in the previous trajectory of the vehicle. In particular, for each spatial position in the environment which is occupied by the vehicle, the data value in the vehicle time channel which corresponds to the spatial position defines the time point at which the vehicle occupies the spatial position. Moreover, the data value in each respective vehicle motion parameter channel which corresponds to the spatial position defines the value of the respective motion parameter characterizing the motion of the vehicle when the vehicle occupies the spatial position in the environment.

Generally, the environment may include multiple spatial positions which are not included in either the previous trajectory or the candidate future trajectory of the vehicle. For these spatial positions, the data preparation system 206 can set the data values in the vehicle time channel and the vehicle motion parameter channels which correspond to these spatial positions to a default value (e.g., the value 0).

When the same spatial position in the environment is occupied by the vehicle at multiple time points, then the system 206 can set the respective data values in the vehicle time channel and motion parameter channels which correspond to the spatial position to any appropriate values. For example, the system 206 can set the respective data values in the vehicle time channel and motion parameter channels which correspond to the spatial position in accordance with the last time point when the vehicle occupies the spatial position. That is, the system 206 can set the data value in the vehicle time channel which corresponds to the spatial position to define the last time point when the vehicle occupies the spatial position. Moreover, the system 206 can set the respective data values in the vehicle motion parameter channels to define the values of the respective motion parameters characterizing the motion of the vehicle when the vehicle last occupies the spatial position.

To represent the trajectories of the agents in the environment in the vicinity of the vehicle, the data representation optionally includes an auxiliary time channel and respective auxiliary motion parameter channels corresponding to each of the predetermined number of motion parameters. As depicted in FIG. 4, the data representation 222 may include an auxiliary time channel 410, an auxiliary velocity channel 412, an auxiliary acceleration channel 414, and an auxiliary heading channel 416.

The auxiliary time channel and the auxiliary motion parameter channels jointly represent the previous trajectories of the non-reference agents (which in this example are all secondary agents) up to the current time point, and optionally, predicted future trajectories of the non-reference agents after the current time point. The system 206 may obtain the predicted future trajectories of the agents as behavior prediction outputs of a behavior prediction neural network from a previous time point. A predicted future trajectory of an agent specifies, for each of multiple future time points after the current time point, a spatial position in the environment that can be occupied by the agent at the future time point. For each of the multiple future time points, the predicted future trajectory further specifies possible values of each of the predetermined number of motion parameters that characterize the motion of the agent at the future time point.

For brevity, the description which follows refers to the auxiliary time channel and the auxiliary motion parameter channels representing the previous trajectories of the agents up to the current time point. It should be understood that the auxiliary time channel and the auxiliary motion parameter channels can similarly represent predicted future trajectories of the agents after the current time point in addition to the previous trajectories of the agents up to the current time point.

The auxiliary time channel jointly represents the respective time points at which the agents occupy different spatial positions in the environment in the previous trajectories of the agents. Each auxiliary motion parameter channel represents the values of the respective motion parameters characterizing the motion of the agents when the agents occupy different spatial positions in the environment in the previous trajectories of the agents. In particular, for each spatial position in the environment which is occupied by one of the agents, the data value in the auxiliary time channel which corresponds to the spatial position defines the time point at which the agent occupies the spatial position. Moreover, the data value in each respective auxiliary motion parameter channel which corresponds to the spatial position defines the value of the respective motion parameter characterizing the motion of the agent when the agent occupies the spatial position in the environment.

Generally, the environment may include multiple spatial positions which are not included in either the previous trajectory or the predicted future trajectory of any of the agents. For these spatial positions, the data preparation system 206 can set the data values in the auxiliary time channel and the auxiliary motion parameter channels which correspond to these spatial positions to a default value (e.g., the value 0).

When the same spatial position in the environment is occupied by agents at multiple time points, then the system 206 can set the respective data values in the auxiliary time channel and auxiliary motion parameter channels which correspond to the spatial position to any appropriate values. For example, the system 206 can set the respective data values in the auxiliary time channel and auxiliary motion parameter channels which correspond to the spatial position in accordance with the last time point when one of the agents occupies the spatial position.

By jointly representing the trajectories of the agents using a single auxiliary time channel and a single auxiliary motion parameter corresponding to each motion parameter, the system 206 can generate data representation with a predetermined dimensionality irrespective of the (variable) number of agents. In this manner, the data representation 222 generated by the system 110 can be readily processed by the importance scoring model, which is configured to process data representation 222 of the predetermined dimensionality.

In some implementations, the system 206 can include further channels in the data representation 222 in addition to the time channels and motion parameter channels. For example, the data representation 222 can include one or more of: a road-graph channel, a vehicle localization channel, and an auxiliary localization channel. A road-graph channel represents a known geometry of the environment in the vicinity of the vehicle 102. For example, the road-graph channel may represent the positions of different features of the environment, including: the road, different lanes in the road, crosswalks, traffic lights, construction zones, school zones, and the like. A vehicle localization channel represents the spatial position of the vehicle in the environment at the current time point (e.g., as defined by a bounding box). An auxiliary localization channel (e.g., the auxiliary localization channel 418) jointly represents the positions of each of the agents in the environment at the current time point (e.g., as defined by bounding boxes). In the example depicted in FIG. 4, the road-graph channel and the vehicle localization channel are superimposed onto a single channel 420.

The system 110 determines the data representation 222 by aligning and channel-wise concatenating the generated channels, as depicted by 422. That is, the data representation 222 is a concatenation of the generated channels. By implicitly representing the respective trajectories of the vehicle and the agents in this format, the system 206 generates a representation which is both compact and can be effectively processed by an importance scoring model 210a or 210b. In some examples, the importance scoring model 210a and/or 210b may be a convolutional neural network model. The importance scoring model can process the data representation using convolutional neural network layers defined by multi-dimensional (e.g., two- or three-dimensional) convolutional filters, thereby enabling the importance scoring model to learn complex spatial relationships between different spatial regions of the environment. The primary agent-centric data representations 222 corresponds to the data representation of the same number shown in FIG. 2, and the SDC-centric first data input 302a shown in FIGS. 3A-3B.

Figure 5A:
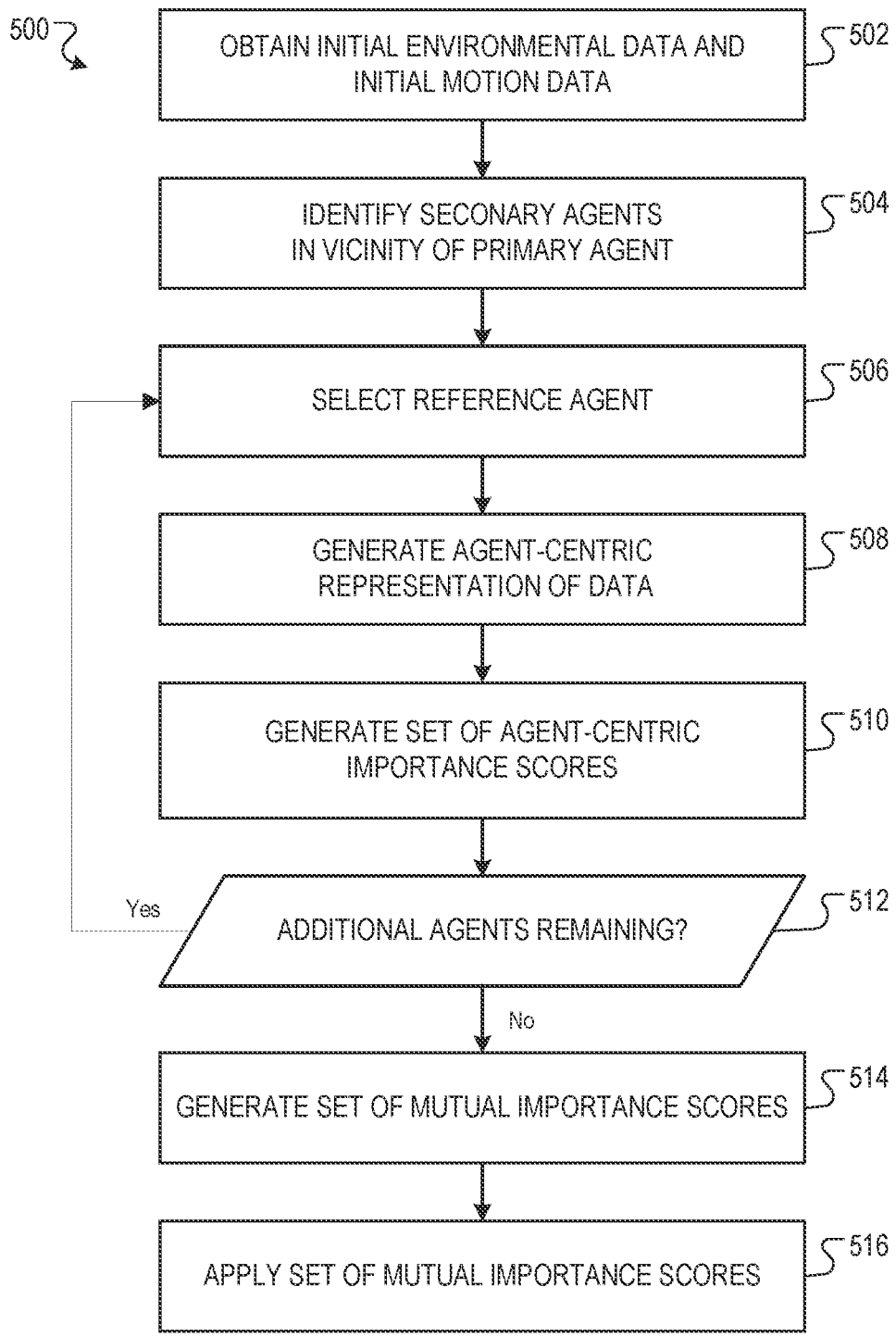
FIGS. 5A-5B are flow diagrams of an example process for generating mutual importance scores, and using the mutual importance scores to select high-priority agents for which to generate prediction data.
Figure 5B:
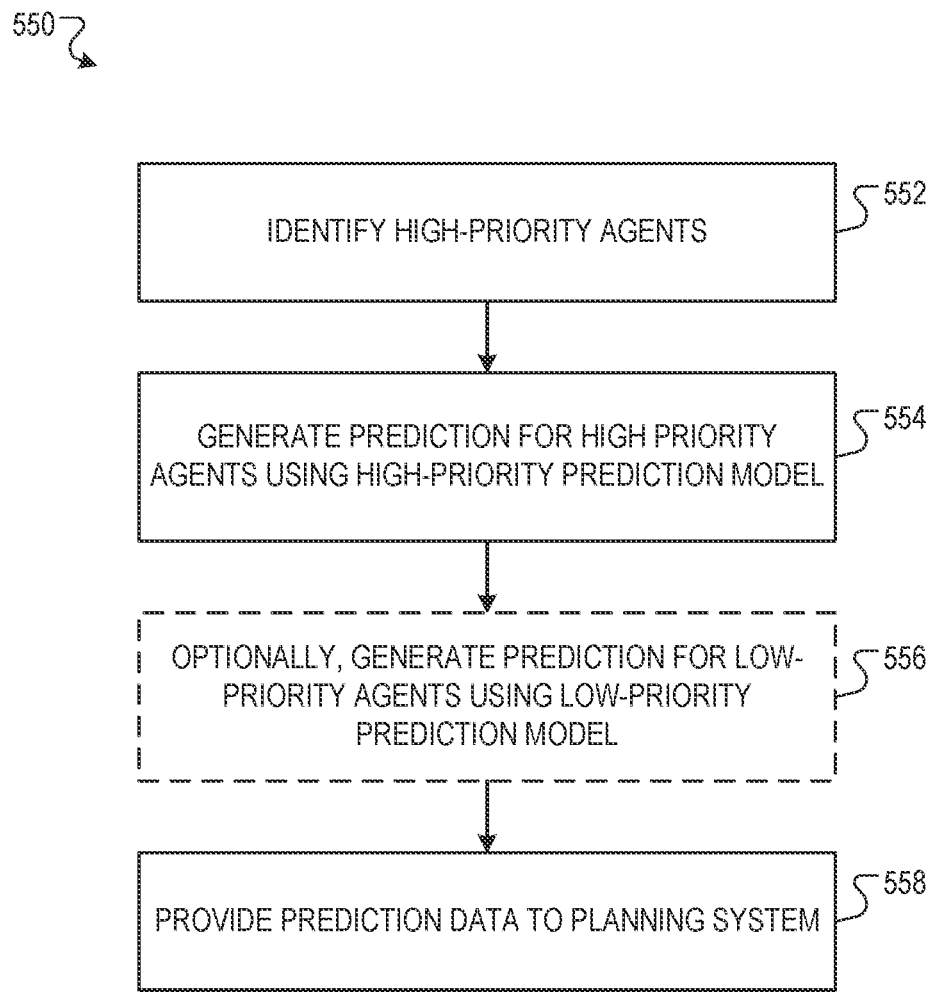

FIGS. 5A-5B are flow diagrams of example processes 500, 550 for generating mutual importance scores, and using the mutual importance scores to select high-priority agents for which to generate prediction data. For convenience, the processes 500, 550 will be described as being performed by a system of one or more computers located in one or more locations. For example, an on-board system, e.g., the on-board system 100 of FIG. 1, appropriately programmed in accordance with this specification, can perform the processes 500, 550.

The system obtains initial environmental data and initial motion data (502). Generally, the initial environmental and motion data are not yet formatted for processing by an importance scoring model. The initial environmental data and motion data may or may not be oriented around the primary agent (e.g., the self-driving car), but is not typically oriented around a secondary agent in the vicinity of the primary agent. The initial environmental data may include sensor data that describes observations of the environment at a current point in time (e.g., based on LIDAR signals, camera images, or the like). The initial environmental data may further include a road graph, a spatial position of the primary agent in the environment at the current point in time, and spatial positions of agents in the environment at the current point in time. The initial motion data may include past and/or future motion data for the primary agent and/or secondary agents in the environment.

The system identifies the secondary agents in the vicinity of the vehicle (primary agent) (504). For example, the system may process aspects of the environment data using an object detection neural network to generate data defining the predicted positions and types (e.g., vehicle, pedestrian, bicyclist, and the like) of multiple objects in the vicinity of the vehicle. The system can subsequently identify the secondary agents in the vicinity of the vehicle as those objects that have been identified as being, for example, a vehicle, a person, or a bicyclist. In certain situations, the system may not identify any agents in the vicinity of the vehicle, for example, if the vehicle is travelling on an otherwise empty roadway. In these situations, the system may not generate any prediction data at the time point. The description of the processes 500, 550 which follows assumes that the system identifies one or more agents in the vicinity of the vehicle.

The system selects a reference agent (506). The reference agent is the agent against which other (non-reference) agents' presence is assessed to determine the likely impact of the other agents on planning decisions of the reference agent. In some cases, the first system may first select the vehicle (primary agent) as the reference agent, and then select secondary agents as the reference agent in subsequent iterations. A data preparation engine processes the initial environment and motion data to generate an agent-centric representation of the environment and motion data oriented around the selected reference agent (508). An importance scoring model processes the agent-centric data representation to generate an agent-centric set of importance scores (510). The agent-centric set of importance scores indicates, for each non-reference agent in the vicinity of the reference agent, an estimated relevance or impact of the non-reference agent on future planning decisions of the reference agent (e.g., planning of a trajectory of future movements of the reference agent). The agent-centric set of importance scores can be calculated without respect to the reference agent's predicted impact on the planning decisions of the non-reference agents. In some implementations, separate importance-scoring models are employed to process input data representations according to whether the reference agent is the primary agent or a secondary agent. These operations (506-510) are repeated until agent-centric sets of importance scores have been generated for the primary agent and all of the identified secondary agents. For instance, the system can determine whether additional agents remain to be evaluated (512), and if so, returns to 510 to select a remaining agent as the next reference agent. Once agent-centric sets of importance scores have been generated for the primary agent and all secondary agents, a ranking engine can generate a set of mutual importance scores based on the agent-centric importance scores. The agent-centric importance scores indicate an estimated level of interaction (e.g., mutual impact or mutual relevance) between the primary agent and each secondary agent. For example, if the independent agent-centric importance scores between the primary agent and a given secondary agent are both high, the ranking engine may assign a high mutual importance score to that secondary agent.

The mutual importance scores can then be applied by one or more systems to various ends (516). The process 550 represented by the flow diagram in FIG. 5B illustrates one such application. For instance, the ranking engine (e.g., ranking engine 212) or another aspect of the prediction system (e.g., prediction system 106) can identify a set of high-priority secondary agents in the vicinity of the vehicle based on the mutual importance scores (552). For example, the system may identify each secondary agent with a mutual importance score that satisfies a predetermined threshold as a high-priority agent. As another example, the system may identify a predetermined number of the secondary agents with the highest importance scores as high-priority agents. In certain situations, the system may identify none or all of the secondary agents in the vicinity of the vehicle as high-priority agents.

The system generates prediction data for the high-priority agents using a prediction model (554). In some implementations, the prediction model may generate classification prediction data which predicts the type of a secondary agent (e.g., animal, pedestrian pushing cart, pedestrian directing traffic, pedestrian riding scooter, car, truck, and the like). In some implementations, the behavior prediction model may generate behavior prediction data which characterizes a predicted future behavior of a secondary agent (e.g., braking, accelerating, changing lanes, and the like). In these implementations, the behavior prediction model may generate behavior prediction data for a secondary agent by, for example, processing a representation of the trajectory of the secondary agent up to the current time point using a behavior prediction neural network. A few examples follow.

In some implementations, the behavior prediction data for an agent defines, for each of multiple spatial locations in the environment, a respective probability that the agent will occupy the spatial location at a specified time point after the current time point. In these implementations, the output layer of the behavior prediction neural network may be a sigmoid layer with a respective neuron corresponding to each of the spatial locations in the environment. The probability that the agent will occupy a particular spatial location at the specified time point after the current time point may be defined as the activation of the neuron in the sigmoid output layer that corresponds to the particular spatial location.

In some implementations, the behavior prediction data for an agent defines a probability that a candidate future trajectory of the agent is the actual future trajectory of the agent. In these implementations, the output layer of the behavior prediction neural network may include a single neuron, where the activation of the neuron is defined as the output of an activation function with an output range of [0, 1] (e.g., a sigmoid activation function). The probability that the candidate future trajectory of the agent is the actual future trajectory of the agent may be defined as the activation of the single neuron in the output layer.

In some implementations, the behavior prediction data for an agent defines a respective probability that the agent will make each of a predetermined number of possible driving decisions. For example, the possible driving decisions may include one or more of: yielding, changing lanes, passing, braking, and accelerating. In these implementations, the output layer of the behavior prediction neural network may be a sigmoid layer with a respective neuron corresponding to each of the possible driving decisions. The probability that the agent will make a particular driving decision after the current time point may be defined as the activation of the neuron in the sigmoid output layer that corresponds to the particular driving decision.

Optionally, the system generates prediction data for any low-priority agents (i.e., secondary agents that are not designated as high-priority agents) using one or more prediction models which are less computationally intensive than the prediction model used to generate the prediction data for the high-priority agents (556). For example, the prediction model(s) used to generate prediction data for the low-priority agents may have fewer model parameters than the prediction model used to generate prediction data for the high-priority agents. In a particular example, the prediction models may be neural networks, and the neural network(s) used for the low-priority agents may have fewer neural network weights than the neural network(s) used for the high-priority agents. In some cases, the system may determine not to generate any prediction data for some or all of the low-priority agents (e.g., if their respective importance scores do not satisfy a predetermined threshold).

The system provides the generated prediction data (for the high-priority agents, and optionally, for any low-priority agents) to the planning system of the vehicle (558). The planning system uses the prediction data to generate planning decisions which plan the future trajectory of the vehicle.

Figure 6:
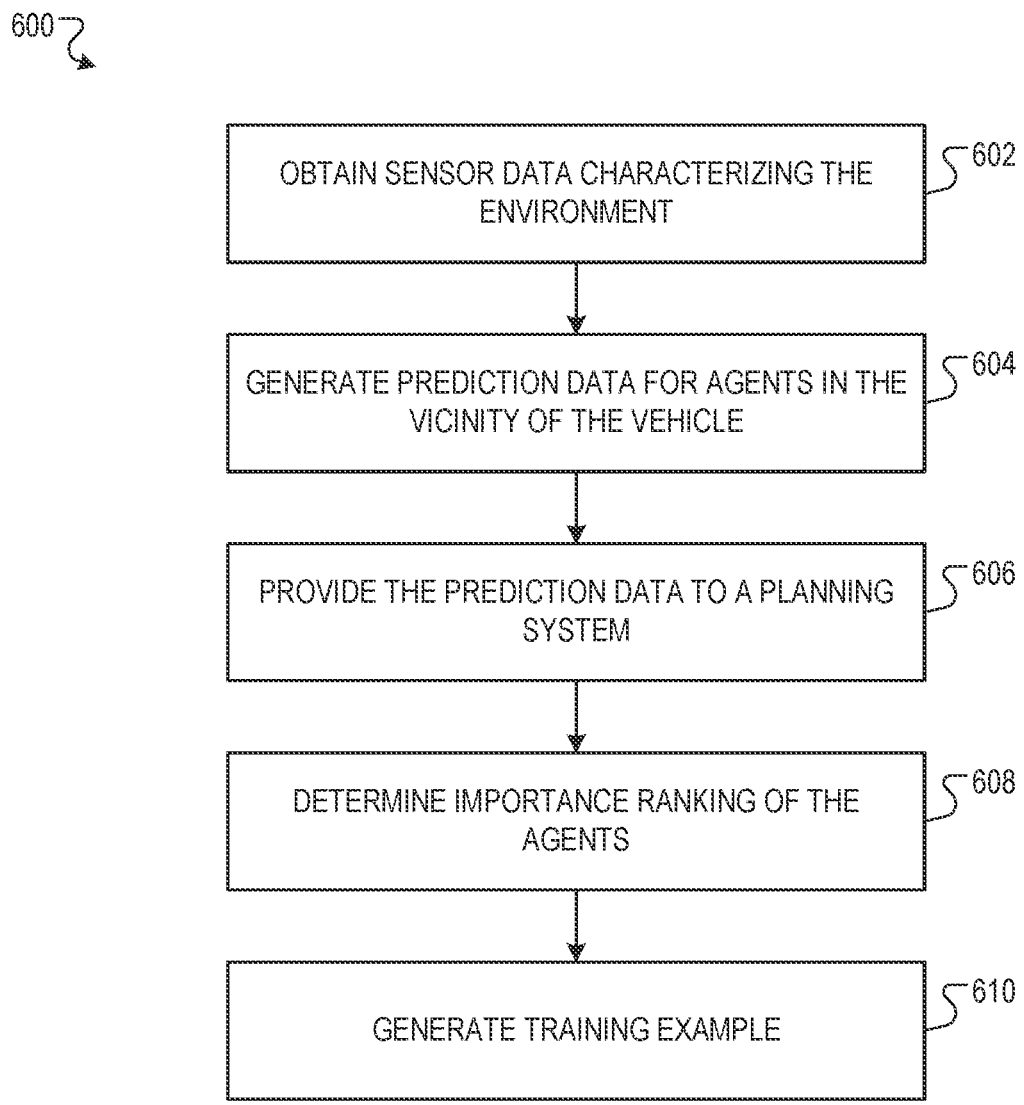
FIG. 6 is a flow diagram of an example process for generating a training example which can be used to train an importance scoring model.

FIG. 6 is a flow diagram of an example process 600 for generating a training example which can be used to train an importance scoring model. For convenience, the process 600 will be described as being performed by a system of one or more computers located in one or more locations. For example, a training system, e.g., the training system 120 of FIG. 1, appropriately programmed in accordance with this specification, can perform the process 600.

The system obtains sensor data characterizing the environment in a vicinity of a vehicle (primary agent) at a given time point (602). The system may obtain the sensor data from a sensor data log which is stored in a physical data storage device or a logical data storage area. The sensor data may be real sensor data characterizing a real-world environment in the vicinity of a vehicle, or simulated sensor data characterizing a simulated environment in the vicinity of a simulated vehicle. As described with reference to FIG. 1, the sensor data may be generated by one or more sensors of the vehicle, including one or more of: laser sensors, radar sensors, and camera sensors. The system can also obtain other forms of environmental and motion data as described herein.

The system generates respective prediction data for the secondary agents in the vicinity of the vehicle (604). For example, the system may generate respective prediction data for every secondary agent in the vicinity of the vehicle which is identified by an object detection system of the vehicle. The behavior prediction data generated by the system for each agent characterizes the predicted future behavior of the agent. For example, for each of the agents in the vicinity of the vehicle, the behavior prediction data may define respective probabilities that the agent makes each of a predetermined number of possible driving decisions (e.g., yielding, changing lanes, passing, braking, or accelerating). To generate the behavior prediction data for an agent, the system may process a representation of the trajectory of the agent up to the given time point using a behavior prediction model (e.g., a behavior prediction neural network as described with reference to FIG. 5B).

The system provides the behavior prediction data to a planning system which is configured to process the behavior prediction data to generate planning decisions which plan a future trajectory for the vehicle (606). The planning decisions generated by the planning system can, for example, include: yielding (e.g., to other vehicles), stopping (e.g., at a Stop sign), passing other vehicles, adjusting vehicle lane position to accommodate a bicyclist, slowing down in a school or construction zone, merging (e.g., onto a highway), and parking.

The system processes the planning decisions generated by the planning system to determine a ranking of the secondary agents in the vicinity of the vehicle at the given time point in order of their impact on the planning decisions (608) of the vehicle. The system may determine the ranking of the secondary agents based on how much the behavior of each agent prompts the planning system to generate planning decisions which would change the future trajectory of the vehicle. For example, the system may determine a score for each agent based on how much each agent prompts the planning system to generate planning decisions which would change the future trajectory of the vehicle, and then determine the ranking of the secondary agents using the scores. In a particular example, the system may determine a score of 12 for Agent A, a score of 0 for Agent B, and a score of 6.5 for Agent C, in which case the system may determine the ranking of the agents as: [A,C,B].

For example, each of the planning decisions may define: (i) an action to be performed by the vehicle (e.g., accelerating, decelerating, stopping, or swerving), and (ii) an agent in the vicinity of the vehicle which prompts the planning system to generate the planning decision (if applicable). In this example, the system may generate a score of 0 for agents which do not prompt the planning system to generate any planning decisions. For an agent which does prompt the planning system to generate a planning decision, the system may determine the score for the agent as a predetermined function of the action specified by the planning decision. For example, if the planning decision specifies the action of braking at 10 feet per second squared, the system may determine the score for the agent to be 10. If a single agent prompts the planning system to generate multiple planning decisions (e.g., braking and swerving), the system can determine the score for the agent as a sum (or other combination) of the respective scores generated for each of the multiple planning decisions.

The ranking of the agents can be broadly understood to be any data which defines that certain agents in the vicinity of the vehicle have a greater impact on the planning decisions than certain other agents in the vicinity of the vehicle. For example, the ranking of the agents may define an explicit ordering of the agents from highest-rank to lowest-ranked, where each agent is assigned a distinct rank. As another example, the ranking of the agents may define a partition of the agents into multiple groups, where each group includes one or more agents. For each pair of groups including a first group and a second group, the ranking may define whether the agents in the first group have a greater impact on the planning decisions than the agents in the second group. The agents within a given group may be understood to have an equivalent impact on the planning decisions.

The system generates a training example which includes: (i) respective feature representations of every agent in the vicinity of the vehicle, and (ii) label data defining the ranking of the agents in the vicinity of the vehicle (610). As described with reference to FIGS. 2-5, the system can generate the feature representation of an agent from portions of the sensor data characterizing the agent, from behavior prediction data generated for the agent by a behavior prediction system at previous time points, or from any other source of information.

In some implementations, a secondary importance scoring model can be similarly trained. The training examples used in this case, however, may be formatted such that a secondary agent is the reference agent in the training sample, and the primary agent (e.g., self-driving car) and other secondary agents are the non-reference agents.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   identifying a first agent in a vicinity of a vehicle;
   determining a first importance score that indicates an importance of the first agent with respect to planning movements for the vehicle;
   determining a second importance score that indicates an importance of the vehicle or a second agent with respect to planning movements for the first agent;
   planning a movement for the vehicle based on the first importance score and the second importance score; and
   controlling the vehicle using information about the movement that was planned based on the first importance score and the second importance score.

2. The method of claim 1, wherein the vehicle is a fully autonomous or semi-autonomous vehicle, and wherein the first agent is another vehicle, a pedestrian, or a cyclist in the vicinity of the vehicle.

3. The method of claim 1, wherein the second importance score indicates an importance of the vehicle with respect to planning movements for the first agent.

4. The method of claim 1, wherein the second importance score indicates an importance of the second agent with respect to planning movements for the first agent.

5. The method of claim 1, further comprising determining, based on the first importance score and the second importance score, a mutual importance score that indicates a mutual importance of the vehicle and the first agent with respect to planning movements of each other, wherein the movement is planned using the mutual importance score.

6. The method of claim 1, further comprising, for each of a plurality of reference agents in the vicinity of the vehicle:
   determining a first reference importance score that indicates an importance of the reference agent with respect to planning movements for the vehicle; and
   determining a second reference importance score that indicates an importance of the vehicle or another agent with respect to planning movements for the reference agent.

7. The method of claim 1, further comprising planning the movement for the vehicle using the respective first reference importance scores and the respective second reference importance scores for the plurality of reference agents in the vicinity of the vehicle.

8. The method of claim 1, further comprising classifying the first agent into one of a plurality of priority classes based on the first importance score and the second importance score.

9. A system, comprising:
   a data processing apparatus; and
   a memory in communication with the data processing apparatus and storing instructions that, when executed, cause the data processing apparatus to perform operations comprising:
      identifying a first agent in a vicinity of a vehicle;
      determining a first importance score that indicates an importance of the first agent with respect to planning movements for the vehicle;
      determining a second importance score that indicates an importance of the vehicle or a second agent with respect to planning movements for the first agent;
      planning a movement for the vehicle based on the first importance score and the second importance score; and
      controlling the vehicle using information about the movement that was planned based on the first importance score and the second importance score.

10. The system of claim 9, wherein the vehicle is a fully autonomous or semi-autonomous vehicle, and wherein the first agent is another vehicle, a pedestrian, or a cyclist in the vicinity of the vehicle.

11. The system of claim 9, wherein the second importance score indicates an importance of the vehicle with respect to planning movements for the first agent.

12. The system of claim 9, wherein the second importance score indicates an importance of the second agent with respect to planning movements for the first agent.

13. The system of claim 9, wherein the operations further comprise determining, based on the first importance score and the second importance score, a mutual importance score that indicates a mutual importance of the vehicle and the first agent with respect to planning movements of each other, wherein the movement is planned using the mutual importance score.

14. The system of claim 9, wherein the operations further comprise, for each of a plurality of reference agents in the vicinity of the vehicle:
- determining a first reference importance score that indicates an importance of the reference agent with respect to planning movements for the vehicle; and
- determining a second reference importance score that indicates an importance of the vehicle or another agent with respect to planning movements for the reference agent.

15. The system of claim 9, wherein the operations further comprise planning the movement for the vehicle using the respective first reference importance scores and the respective second reference importance scores for the plurality of reference agents in the vicinity of the vehicle.

16. The system of claim 9, wherein the operations further comprise classifying the first agent into one of a plurality of priority classes based on the first importance score and the second importance score.

17. One or more non-transitory computer-readable storage media having instructions stored thereon that, when executed by data processing apparatus, cause the data processing apparatus to perform operations comprising:
- identifying a first agent in a vicinity of a vehicle;
- determining a first importance score that indicates an importance of the first agent with respect to planning movements for the vehicle;
- determining a second importance score that indicates an importance of the vehicle or a second agent with respect to planning movements for the first agent;
- planning a movement for the vehicle based on the first importance score and the second importance score; and
- controlling the vehicle using information about the movement that was planned based on the first importance score and the second importance score.

18. The one or more non-transitory computer-readable storage media of claim 17, wherein the vehicle is a fully autonomous or semi-autonomous vehicle, and wherein the first agent is another vehicle, a pedestrian, or a cyclist in the vicinity of the vehicle.

19. The one or more non-transitory computer-readable storage media of claim 17, wherein the second importance score indicates an importance of the vehicle with respect to planning movements for the first agent.

20. The one or more non-transitory computer-readable storage media of claim 17, wherein the second importance score indicates an importance of the second agent with respect to planning movements for the first agent.

* * * * *